Jan. 18, 1955  A. BRANDT  2,699,610
READJUSTABLE THREAD GAUGE
Filed Nov. 7, 1951  2 Sheets-Sheet 1

INVENTOR.
ADRIANUS BRANDT
BY
AGENT

Jan. 18, 1955  A. BRANDT  2,699,610
READJUSTABLE THREAD GAUGE
Filed Nov. 7, 1951  2 Sheets-Sheet 2

INVENTOR
Adrianus Brandt
By
Agent

United States Patent Office 2,699,610
Patented Jan. 18, 1955

2,699,610

READJUSTABLE THREAD GAUGE

Adrianus Brandt, Eindhoven, Netherlands, assignor to Hartford National Bank and Trust Company, Hartford, Conn., as trustee Application November 7, 1951, Serial No. 255,163

Claims priority, application Netherlands December 2, 1950

9 Claims. (Cl. 33—199)

This invention relates to improvements in adjustable or re-adjustable thread gauges by means of which thread gauges can be set and reset after wear by unskilled labor and inexpensively.

This application is a continuation in part of my pending application Ser. No. 155,757 filed April 13, 1950, now U. S. Patent No. 2,666,264.

For measuring and testing threads by means of gauges having a "go" and "no go" side it is not necessary for both the "go" side and the "no go" side of the gauge to test all the dimensions of the thread. If the "go" side tests all the dimensions of the thread to be measured up to a given maximum, so that one may be sure that the measured thread fits its corresponding internal thread, for example, for a nut or a tapped hole, the "no go" side needs measure only the width of the profile in situ of the effective diameter, thus testing this diameter. If the said width is not below a given measure, one may be sure that the screw will actually rest on the flanks of the thread.

Thread gauges are known which have a "go" and "no go" side and are constructed in the aforesaid manner. It is also known to design the measuring surfaces proper as measuring rollers comprising a number of slots for the "go" side and measuring rollers comprising a single or a few slots for the "no go" side. In this case, the rollers comprise an exactly central bore accommodating a bushing provided with a cylindrical end, which is eccentric to the bushing. By means of a screw the bushing and the roller are so secured to the body of the gauge as to permit free rotation of the roller around the bushing and, moreover, a slight axial displacement of the roller. The adjustment of the gauge to the correct measure is effected by slightly turning the bushing with the eccentric end. In the case of the measuring surfaces becoming worn, the gauge may also be readjusted in this manner. This method of readjustment requires skilled workmen, takes much time and renders the manufacture expensive. Moreover, after adjustment the screw must be locked and sealed against rotation. In practice it has been found that this locking usually causes the gauge to be out of alignment.

Furthermore, thread gauges are known in which the measuring rollers, having the theoretical profile of the thread to be measured are housed in apertures of the body of the gauge, fitting as closely as possible in these apertures, being rotatable therein about their axes, and being slightly displaceable in an axial direction.

The present invention relates to a thread gauge which does not exhibit the aforesaid disadvantages of known gauges, is comparatively easy to manufacture and is adjustable and readjustable by simple means in a short time by unskilled labor. The readjustable thread gauge according to the invention comprises at least two reference measurements or surfaces for measuring threads, one component part of the gauge comprising a number of teeth arranged parallel to the direction of length of this part and the other gauge part comprising at least two measuring rollers which are rotatable with respect to this part and are each provided with number of peripheral circularly arranged teeth. The tangent plane of two imaginary cylinders located co-axially with the measuring rollers and the diameters of which are the effective diameters of the teeth on the measuring rollers, make an angle with the plane comprising the tops of the teeth of the other gauge part, and one gauge part is displaceable with respect to the other gauge part.

In one embodiment of the invention, one gauge part is provided with cavities, whose diameters each correspond to the major diameters of the teeth of the measuring rollers engaging said cavities. The center lines of said cavities are equispaced from the measuring side of the side part of the gauge and the cavities are provided in this gauge part in such manner that the teeth on the measuring rollers extend beyond the said gauge part at least throughout their depth, the measuring rollers being freely displaceable through a given distance in their direction of length in the cavities.

In one embodiment of the invention, the foremost roller with respect to the entrance of the gauge comprises a number of uniform teeth, whose cross-section in a plane through the center line of the roller exhibits the theoretical profile of the thread to be measured, and the next following roller comprises at least two teeth limiting a slot, which teeth and slot, where the effective diameter of the thread to be tested is measured, each have a width equal to the desired width of the thread profile at this point. The remainder of the slot has dimensions at least partly exceeding the corresponding theoretical dimensions of the thread profile.

In a further embodiment of the invention, the first gauge part may advantageously comprise at least one tooth which, where the effective diameter of the thread to be tested is measured, has a width corresponding to the measure of the desired width of the thread profile at this point, and the remainder of the slot has dimensions at least partly exceeding the corresponding theoretical dimensions of the thread profile, said tooth preferably being located centrally relatively to the other teeth.

In an advantageous embodiment of the invention, the minimum number of teeth opposite the next following measuring roller is two and the maximum is four which teeth limit one or more slots which, where the effective diameter of the thread to be tested is measured, each has a width corresponding to the desired width of the thread profile at this point. The remainder of the slot has dimensions at least partly exceeding the corresponding theoretical proportions of the thread profile.

In a further embodiment of the invention, the tooth opposite the next following measuring roller is integral with a central tooth of the series of teeth opposite the foremost roller.

Readjustment of the thread gauge according to the invention may, in one embodiment thereof, be effected in such manner that one component part of the gauge is displaceable with respect to the other gauge part in a direction at right angles to the plane containing the measuring points of the other gauge part. In one embodiment of the invention, the displacement is preferably effected by shifting one gauge part relatively to a wedge-shaped member parallel to one of the converging surfaces of this member. In another embodiment of the invention, one of the converging surfaces of the wedge extends parallel to the tangent plane of two imaginary cylinders which are located co-axially with the measuring rollers and the diameters of which are the effective diameters of the teeth on the measuring rollers, the other converging surface extending parallel to the plane in which the crests of the other teeth lie.

A sufficiently precise readjustment of the gauge according to the invention is obtained if the slope of the converging surface of the wedge relative to that of its other converging surface is from 1:100 to 1:500. In a further embodiment of the invention, readjustment is still further facilitated by providing a scale division both on the wedge and on one of the parts of the gauge, these divisions together constituting a vernier scale.

In order that the invention may be more clearly understood and readily carried into effect, it will now be described more fully with reference to the accompanying drawings, representing one example thereof, in which.

Figure 3:
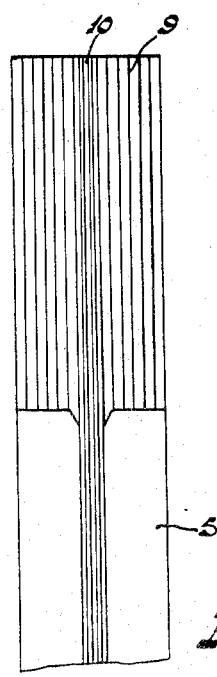
Fig. 3 is an elevation of the other gauge part, also viewed from the measuring side and to a larger scale.
Figure 4:
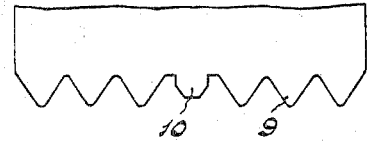
Fig. 4 is a plan view on a larger scale of the part of the gauge shown in Fig. 3.
Figure 5:
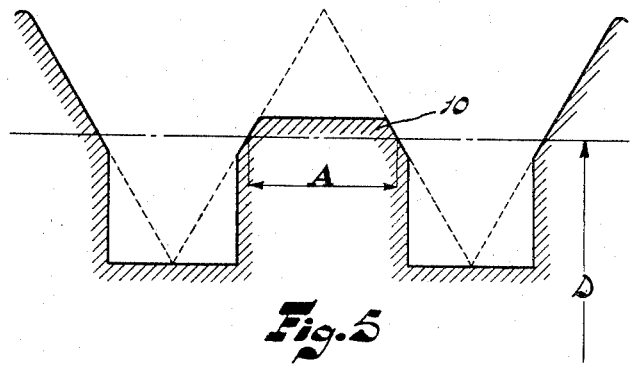
Fig. 5 shows, on a still larger scale, the central tooth depicted in Fig. 4.

In the drawing, the reference numeral 1 denotes a U-shaped body having two limbs 2 and 3, the inner surface 4 of limb 2 being surface ground. In this U-shaped body 1, an elongated part 5 of the gauge rests against the surface 4 and is tightly drawn by means of a screw 6 against the bottom 8 of the U-shaped body. The inner surface 7 of part 5 of the gauge is also partly surface ground, its bottom side being slightly spherically curved. This inner surface exhibits at the upper side a profile shown in elevation in Fig. 3 and in plan view in Fig. 4. In these figures, six teeth designated 9 limit slots exhibiting the theoretical profile of the thread to be measured, allowance being made for the permitted manufacturing tolerance for gauges. A tooth 10 arranged centrally with respect to the teeth 9 exhibits the profile drawn to a larger scale in Fig. 5. Where the effective diameter D of the thread to be measured is tested, said tooth 10 has a width corresponding to the desired width of the threaded profile at this point. The effective or pitch diameter of a thread is defined as the diameter corresponding to one half of the sum of the major and minor diameters of the profile, it being assumed that there are no roundings at the crest or at the root, or that the roundings are equal. The tooth 10 extends along the part 5 of the gauge past the second of two measuring rollers, referred to hereinafter on the other part of the gauge, but the teeth 9 are not extended.

Figure 1:
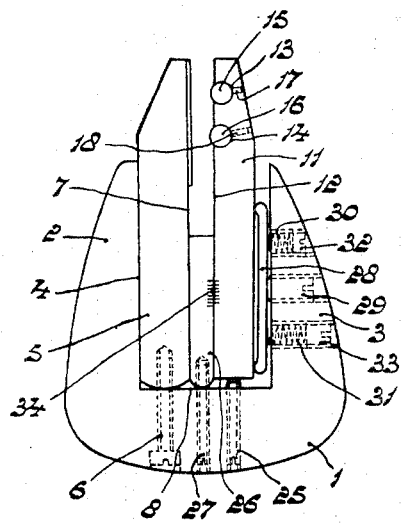
Fig. 1 is an elevation of a readjustable thread gauge for determining two reference measurements.
Figure 2:
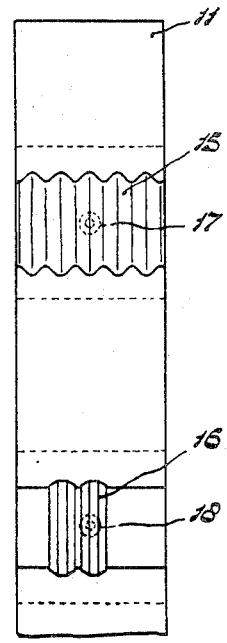
Fig. 2 is an elevation of one gauge part comprising two measuring cylinders and, viewed from the measuring side, drawn to a larger scale.
Figure 6:
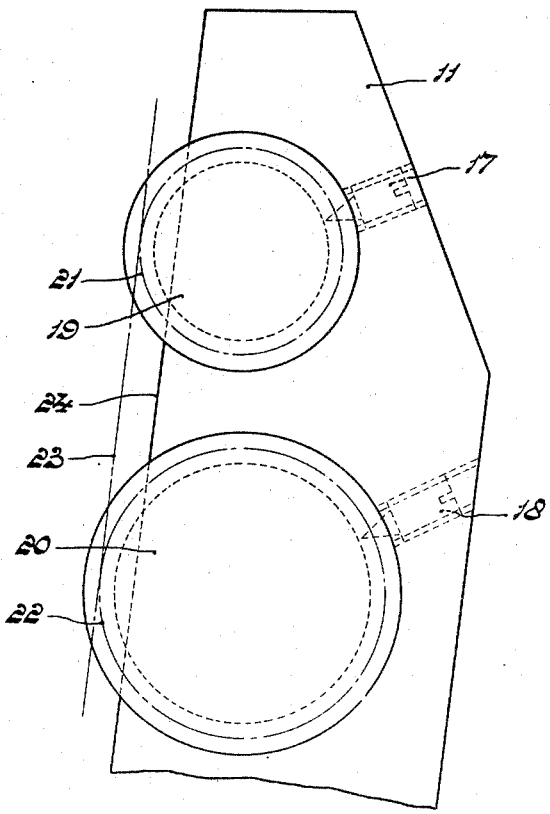
Fig. 6 shows, also on a larger scale two measuring rollers whose diameters, in contradistinction to those shown in Fig. 1 are unequal.

The U-shaped body 1 furthermore comprises a gauge part 11 which is also ground and lapped at the inner side 12. This part 11 comprises two cavities 13 and 14 in which the envelopes of two measuring rollers 15 and 16 fit closely. These measuring rollers are held by screws 17 and 18 having shaft points. Owing to this, the measuring rollers are slightly displaceable in an axial direction and, moreover, are rotatable about their spindles. The measuring roller 15 is furnished with teeth the same as those which are designated 9 in Fig. 4 and, in cross-section consequently exhibit the theoretical profile of the thread to be measured. The measuring roller 16 has only two teeth exhibiting the profile such as shown at 10 of Fig. 4 and limiting a slot which, where the effective diameter D of the thread to be tested is measured, has a width corresponding to the desired width of the thread profile at this point. Although the two measuring rollers shown in Figures 1 and 2 have equal diameters, this is not necessary, since they may alternatively have different diameters. However, it is necessary for the adjustment and readjustment of the gauge referred to hereinafter, that the tangent plane of two imaginary cylinders which are located co-axially with the measuring rollers and whose diameters are the effective diameters of the teeth on the measuring rollers, is parallel with the surface 12 of the gauge part. This is shown in Fig. 6 representing two measuring rollers 19 and 20 having different diameters, wherein co-axially located cylinders 21 and 22 may be imagined which have the effective diameters of the teeth on the measuring rollers as diameters and whose tangent plane 23 is parallel with the surface 24.

The gauge part 11 is supported by a set screw 25. Between the gauge parts 5 and 11 is provided a wedge-shaped member 26 which is drawn by a screw 27 against the inner side 8 of the body 1 and which determines the spacing between parts 5 and 11. The gauge part 11 is urged against the wedge 26 by a push member 28 which in turn is acted upon by a screw 29. Moreover, two springs 30 and 31 are provided which also act upon the push member 28 and are set by means of screws 32 and 33.

The adjustment, and, as the case may be, readjustment of the gauge is effected by displacing the gauge part 11 relatively to the wedge 26, a vernier scale 34 facilitating these operations. It has been found that they may be performed by comparatively unskilled labor and, moreover, in a rapid manner. Locking of the screws is not necessary so that this cannot involve accidental displacement.

Since the length of the "go" measuring roller 15 practically corresponds to the width of the gauge part 11 and is furnished with teeth throughout its length, it is possible to measure a screw up to right below its head, and owing to the extended tooth 10 a guide for the thread is formed with the result that the object to be measured is automatically introduced at the correct point into the "no go" side of the gauge.

The slope of surface 12 relatively to surface 7 is determined by converging sides of the wedge 26. The slope of one of these sides relatively to that of the other side may be from 1:100 to 1:500, which permits sufficient possibility of adjustment.

If the two measuring rollers 15, 16 and the teeth 9, 10 are made from hard metal, the teeth 9, 10 being secured to part 5, in a known manner, for example by soldering, the wear occurring in using the gauge is a minimum.

What I claim is:

1. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member, one of said rollers being located adjacent to the open end of said gauge and having a plurality of uniform teeth, the cross-section of said uniform teeth taken on a plane through the center line of the roller showing a theoretical profile of the thread to be measured, and the other of said rollers located remote from said open end having at least two teeth defining a slot each having a width equal to the desired width of the thread profile at a predetermined point and the remainder of said slot having dimensions at least partly exceeding the corresponding theoretical dimensions of said thread profile whereby a plane tangent to the surfaces of said measuring rollers opposed to said first measuring member is at an angle with a plane through the apexes of said teeth on said first measuring member.

2. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member and each being provided with a number of peripherally arranged teeth, the diameters of said cylindrical recesses corresponding to the major diameter of the teeth of the measuring rollers in said recesses, said recesses opening into the measuring side of said second measuring member thereby permitting peripheral portions of said teeth on said measuring rollers to extend beyond the measuring surface of said second measuring member, means to mount said measuring rollers so that they are freely displaceable in the direction of their length through a predetermined distance in said recesses whereby a plane tangent to the surfaces of said measuring rollers opposed to said first measuring member is at an angle with a plane through the apexes of said teeth on said first measuring member.

3. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member and each being provided with a number of peripherally arranged teeth, part of the teeth on said first measuring member being located opposite to one of said measuring rollers whereby a plane tangent to the surfaces of said measuring rollers opposed to said first measuring member is at an angle with a plane through the apexes of said teeth on said first measuring member.

4. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, at least one of said teeth being located centrally of the other teeth and having a width corresponding to the desired width of the thread profile of the thread to be measured, the slots on both sides of said one tooth having dimensions which at least partly exceed the corresponding theoretical dimensions of the thread profile, said second measuring member having at least two cylindrical recesses therein, a measuring roller being provided in each of said recesses, said rollers being rotatable relative to said second measuring member and each being provided with a number of peripherally arranged teeth whereby a plane tangent to the surfaces of said measuring rollers opposed to said first measuring member is at an angle with a plane through the apexes of said teeth on said first measuring member.

5. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, said second measuring member having at least to cylindrical recesses therein, a measuring roller being provided in each of said recesses, said rollers being rotatable relative to said second measuring member and each being provided with a number of peripherally arranged teeth, one of said rollers being located adjacent to the open end of said gauge and having a plurality of uniform teeth, the cross-section of said uniform teeth taken on a plane through the center line of the roller showing a theoretical profile of the thread to be measured, part of said teeth on said first measuring member opposite said measuring roller adjacent to the open end of said gauge in cross-section perpendicular to the longitudinal direction of said teeth having a profile corresponding to the theoretical profile of said thread, the teeth on said first measuring member opposite the roller located remote from said open end having a maximum of four teeth defining a slot having a width equal to the desired width of the thread profile at a predetermined point whereby a plane tangent to the surfaces of said measuring rollers opposed to said first measuring member is at an angle with a plane through the apexes of said teeth on said first measuring member.

6. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member and each being provided with a number of peripherally arranged teeth, one of said rollers being located adjacent to the open end of said gauge and having a plurality of uniform teeth, the cross-section of said uniform teeth taken on a plane through the center line of the roller showing a theoretical profile of the thread to be measured, part of said teeth on said first measuring member opposite said measuring roller adjacent to the open end of said gauge in cross-section perpendicular to the longitudinal direction of said teeth having a profile corresponding to the theoretical profile of the thread, the teeth on said first measuring member opposite the roller located remote from said open end having a maximum of four teeth defining a slot having a width equal to the desired width of the thread profile at a predetermined point, one of said teeth opposite said roller remote from said open end being integral with a similar tooth which is one of said teeth opposite said roller adjacent to the open end of said gauge whereby a plane tangent to the surfaces of said measuring rollers opposed to said first measuring member is at an angle with a plane through the apexes of said teeth on said first measuring member.

7. A readjustable thread gauge having at least two reference surfaces for measuring threads comprising a U-shaped housing, an elongated first measuring member in said housing, a second measuring member in said housing displaceable relative to said first member, wedge means located between said first and second measuring members for displacing said second measuring member, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member and each being provided with a number of peripherally arranged teeth whereby a plane tangent to the surfaces of said measuring rollers opposed to said first measuring member is at an angle with a plane through the apexes of said teeth on said first measuring member, and means to displace one of said measuring members relative to the other in a direction at right angles to said aforementioned plane.

8. A readjustable thread gauge having at least two reference surfaces for measuring threads comprising a U-shaped housing, an elongated first measuring member in said housing, a second measuring member in said housing displaceable relative to said first member, and a trapezoidal wedge means located between said first and second measuring members for displacing said second measuring member, said wedge means having two converging sides, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member and each being provided with a number of peripherally arranged teeth whereby a plane tangent to the surfaces of said measuring rollers opposed to said first measuring member is at an angle with a plane through the apexes of said teeth on said first measuring member, and means to displace one of said measuring members relative to the other by moving one of said measuring members with respect to said wedge means in a direction parallel to one of said converging surfaces of said wedge means.

9. A readjustable thread gauge having at least two reference surfaces for measuring threads comprising a U-shaped housing, an elongated first measuring member in said housing, a second measuring member in said housing displaceable relative to said first member, and a trapezoidal wedge means located between said first and second measuring members and having two converging sides, said first measuring member being provided with a plurality of teeth arranged parallel to the direction of length of said first measuring member, said second measuring member having at least two cylindrical recesses therein, a measuring roller being provided in each of said recesses, said rollers being rotatable relative to said second measuring member and each being provided with a number of peripherally arranged teeth whereby a plane tangent to the surfaces of said measuring rollers opposed to said first measuring member is at an angle with a plane through the apexes of said teeth on said first measuring member, and one of said converging sides of said wedge means extending parallel to said tangent plane, the other of said converging sides extending parallel to said plane through the apexes of said teeth on said first measuring roller.

References Cited in the file of this patent

UNITED STATES PATENTS

| | | |
|---|---|---|
| 1,489,576 | Hanson | Apr. 8, 1924 |
| 1,613,824 | Hanson | Jan. 11, 1927 |
| 1,660,335 | Johnson | Feb. 28, 1928 |
| 1,961,647 | Sonoda | June 5, 1934 |
| 2,436,528 | Polk et al. | Feb. 24, 1948 |
| 2,616,182 | Brandt | Nov. 4, 1952 |

FOREIGN PATENTS

| | | |
|---|---|---|
| 12,503 | Great Britain | May 28, 1912 |
| 263,360 | Germany | Aug. 7, 1913 |
| 369,516 | Great Britain | Mar. 24, 1932 |
| 875,563 | France | Sept. 28, 1942 |